United States Patent [19]

Kuh

[11] 4,368,045
[45] Jan. 11, 1983

[54] TIME MACHINE/TIME PUZZLE

[76] Inventor: Susan N. Y. Kuh, 2114 Manoa Rd., Honolulu, Hi. 96822

[21] Appl. No.: 185,961

[22] Filed: Sep. 10, 1980

[51] Int. Cl.³ ............................................. G09B 19/12
[52] U.S. Cl. .................................................... 434/304
[58] Field of Search ............... 434/304, 196; 273/156, 273/157 R, 157 A; D21/144

[56] References Cited

U.S. PATENT DOCUMENTS

| D. 193,659 | 9/1962 | Matricardi | D21/144 X |
|---|---|---|---|
| 1,276,344 | 8/1918 | Gilman | 434/304 |
| 2,611,193 | 9/1952 | Davis | 434/196 |
| 2,647,330 | 8/1953 | Ford | 434/304 |
| 2,705,843 | 4/1955 | Hawkins | 434/196 |
| 2,853,804 | 9/1958 | Bengeyfield | 434/304 |
| 3,214,848 | 11/1965 | Van Eycke | 434/429 X |
| 3,238,645 | 3/1966 | Wilson | 434/429 X |
| 4,124,945 | 2/1977 | Totten | 434/304 |

FOREIGN PATENT DOCUMENTS 123140  5/1971  United Kingdom ............... 434/304

Primary Examiner—William H. Grieb

[57] ABSTRACT

An educational device to facilitate learning how to tell time. The device includes a base shaped like the face of a clock and a plurality of pieces representing various lengths of time which are received in a recessed portion of the base. Also included are minute and hour hands and a peg to hold the hands to the base.

1 Claim, 7 Drawing Figures

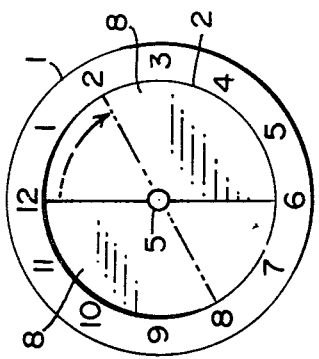
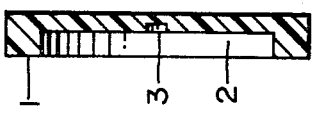
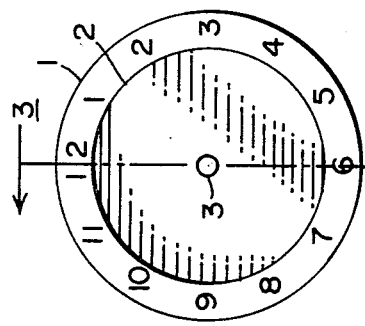
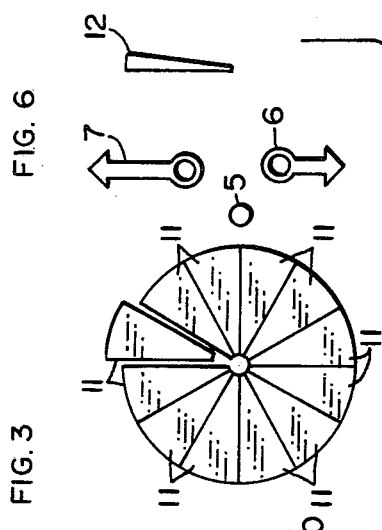
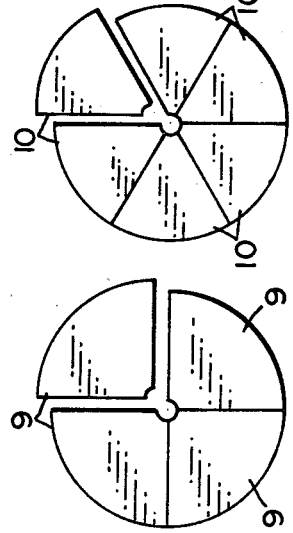
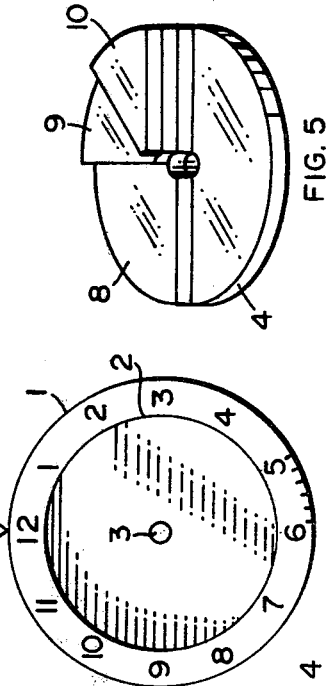
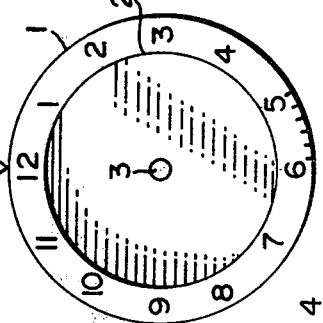
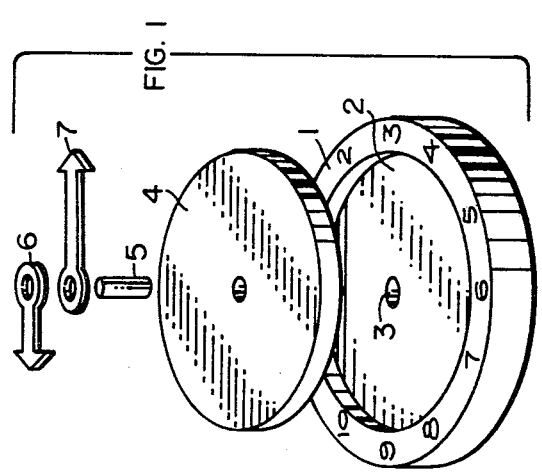
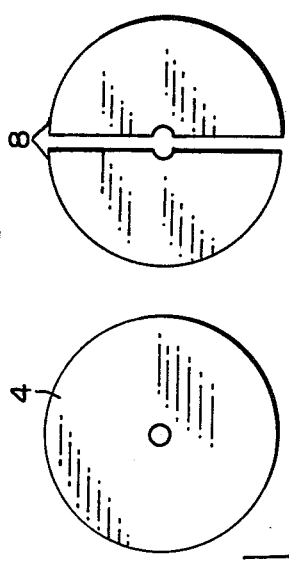

TIME MACHINE/TIME PUZZLE

The Time Machine/Time Puzzle is an educational device which is intended to facilitate learning and teaching how to tell time. Ideally, it's form will be like that of a children's wooden puzzle where there is a base into which are fitted wood cut outs comprising pieces of a whole picture (such as that of a cartoon character). Similar to such a puzzle, the Time Machine is comprised of a base shaped like or depicting the face of a clock, which base will receive pieces of the puzzle. In order to receive these, the circular area within the numbers of the face of the clock-like puzzle base will most likely be recessed, as in the type of children's wooden puzzle described above.

These pieces include: (1) pieces representing lengths of time; (2) an hour hand; (3) a minute hand; (4) a peg to secure the hour and minute hands to the face of the clock puzzle.

The pieces representing lengths of time may include: a circular piece 4, representing one hour/60 minutes; two semi-circular pieces 8, each representing one-half hour/30 minutes; four quarter-hour pieces 9, each equivalent to a quarter circle, each representing fourth hour/15 minutes; six ten-minute pieces 10, each equivalent to one-sixth of a circle; twelve five-minute pieces 11, each equivalent to one-twelfth of a circle; sixty one-minute pieces 12, each equivalent to one-sixtieth of a circle.

When a set of pieces (a set being equal to those pieces representing a certain length of time) is fitted into the recessed area of the puzzle 2, the student can be instructed, or can instruct his or herself, how to tell time by reference to concrete rather than abstract representations of "time". When, for example, the minute hand 7 sweeps over the space covered by the hour piece, he or she can be shown that this means one whole hour has passed (represented by the whole hour piece) and that the hour hand 6 should be moved one digit forward.

In addition, when the sets of pieces (with or without the puzzle base 1) are stacked on top of each other (FIG. 5, with the circular piece, for example, on the bottom, the half-hour piece on top of the circular piece (it's arc aligned with the curve of the circular piece), two quarter-hour pieces on top of the half-hour piece (their arcs aligned with the arc of the half-hour piece) the student can more readily compare the relationship between a whole hour and fractions of an hour. Through the analogy with time the pieces provide, he or she can see that two half-hours are equivalent to a whole hour, or that two quarter-hours are equivalent to one half-hour, or that four quarter-hour pieces are equivalent to one hour piece, and so forth.

In this way, the Time Machine makes less abstract the meaning of various lengths of time, and the meaning of the movement of the hour and minute hands by tying that movement to puzzle pieces embodying "time".

The Time Machine relates to those instructional devices depicting clocks which are used to teach students how to tell time, and to those devices used to teach students mathematical fractions by relating parts of a whole to a whole.

The Time Machine is similar to clock-like instructional devices in purpose: All are intended to help the student learn how to tell time. It differs from those devices in that:

(a) It uses the student's knowledge of mathematical fractions;
(b) It provides concrete embodiments of those fractions in the form of length-of-time puzzle pieces;
(c) It relates those pieces in "b" above to the clock-like puzzle and thus analogizes them to lengths of time by way of puzzle functions; for example, a length of time may be related to a physical whole, analogizing the latter to a whole hour, in order to represent it in concrete fashion—a physical whole for a whole unit of time (one hour);
(d) It relates the pieces amongst themselves, directly linking the size of each piece to a specific length of time, and also by linking each piece's size to every other size thereby linking each length of time to every other length of time FIGS. 4 & 5; for example, one hour piece equals four quarter-hour pieces;
(e) It shows the student that the length-of-time pieces can be rotated around the face of the clock and still remain what they are (i.e. still retain their meaning in terms of lengths of time) FIG. 6;
(f) It uses the student's previous familiarity with children's puzzles via the Time Puzzle—in the former (such as a cartoon character puzzle) pieces of the puzzle are related to each other because they are parts of a whole picture of a cartoon character with whom the student is familiar, the Time Machine relates fractions FIG. 4 with which the student is (or concurrently will be) familiar, to movements of the long and short hands, tying what is known (pieces) to what is unknown (time) defining the latter in terms of the former.

The Time Machine is related to instructional devices used to teach students fractions by relating wholes to parts (as in Hawkins U.S. Pat. No. 2,705,743, Apr. 12, 1955). It differs in that it compares or connects fractions to lengths of time and lengths of time to fractions.

Thus, the Time Machine is an educational puzzle which looks like a two-dimensional rendering of a clock. The purpose of this invention is to facilitate teaching and learning how to tell time.

The circular area just within the numbers (which represent hours) on the face 1 of the clock puzzle may be recessed 2, in order to receive various pieces of the puzzle, just as children's puzzles described above contain a recessed area to receive various pieces of the puzzle. The recessed area will include a hole 3 at its center FIGS. 1 & 3 to hold the peg in place. The puzzle pieces include: (1) Pieces representing an hour, half-an-hour, a quarter-hour, one-sixth hour, one-twelfth hour, and so forth; (2) An hour hand similar in function and in form to the hour hand on a typical clock; (3) A minute hand similar in function and form to the minute hand on a typical clock (4) a peg 5 to secure the hour and minute hands to the face of the clock.

One object of this invention is to make less abstract the concepts of different lengths of time. In implementing this goal, the invention seeks to go beyond the traditional technique of rote memorization of long and short hand positions on the clock.

Another object is to show the student possible relationships between different lengths of time, as for example, what ratio one piece/length of time is to another. The student can be shown ratios when the length-of-time pieces are stacked on top of each other FIG. 5. The ratio of the hour piece, for example, to the quarter-hour pieces is 1:4. That is, every hour piece is equal to four quarter-hour pieces.

Still another object of the Time Machine is to show the student that the length-of-time pieces can be moved "around" the face of the clock, clockwise or counter-clockwise, and still remain what they are FIG. 6. Two of the half-hour pieces, for example, may be fitted into the face of the clock puzzle. The student or teacher may then move the pieces as above. If the flat side of one half-hour piece aligns with the number 12 on the puzzle and simultaneously with the number 6, that half-hour piece can be moved to align with the number 1 and the number 7, or with one minute past 12 and 1 minute past 6, and the piece will still represent half-an-hour in time. This is intended to facilitate greater flexibility in learning, such as the student's recognition that 10:06 a.m. to 10:36 a.m. still means half-an-hour.

Still another object of the Time Machine is to motivate the student to learn by making the learning of time enjoyable. The student may learn by finding his own way of manipulating the pieces of the puzzle into ratios or relationships of his own choosing.

Further, the teaching of time is essential to industrialization, especially to the rate of industrialization or productivity. As such, it may be said that any device which facilitates the learning of time, may prove to be an aid to greater productivity.

FIG. 1 is an exploded view showing how the hour piece, peg, hour and minute hands, fit into the Time Machine;

FIG. 2 is a plan view of the face of the clock puzzle;

FIG. 3 is a sectional view of the face of the clock puzzle, showing recess, and hole for peg;

FIG. 4 is a plan view showing various units of time that will fit in recess, the hour and minute hands, and the peg;

FIG. 5 is a perspective view showing stacking of units of time;

FIG. 6 is a plan view demonstrating half-hour time units 8 rotated;

FIG. 7 is a plan view of one-quarter hour units with hour 13 and minute 14 hands imprinted on faces (alternate).

These drawings do not represent exact dimensions. Dimensions are to be determined by commercial feasibility.

Depending on commercial feasibility, the Time Machine may be made of any material, including wood, wood products, paper, plastic or felt. If made of wood, wood products, or plastic, it is likely that the puzzle base 1 will have a recessed area 2 just inside of the numbers, in order that length-of-time pieces can be fitted by the student or teacher into the base. If made of paper or felt or some material of lesser thickness than wood or perhaps plastic, the puzzle base may not have a recessed area. In this case, the length-of-time pieces will lie on top of the circular area just inside the hour numbers.

The preferred embodiment of the invention is a Time Machine of sufficient thickness to allow a recessed area so that the student may fit pieces into the puzzle FIG. 1. Preferably, each set of length-of-time puzzle pieces should be distinguished from other sets by color; for example, the hour piece may be yellow, the half-hour pieces blue, the quarter-hour pieces red, the ten-minute pieces green, and so forth. The definition of each set of pieces should be printed or inscribed on the back of at least one piece of each set, so that on the back of the half-hour piece, "one-half hour" or "half-an-hour" or "30 minutes" may be inscribed.

The Time Machine may also be manufactured such that the recessed area will hold all of the length-of-time puzzle pieces, lying in layers on top of each other. In this case, the peg 5 to hold the hands of the clock puzzle will be much longer than shown in FIG. 1 (or, long enough to accomodate all the pieces). In the preferred embodiment, however, the puzzle's recess will hold one set at a time, such as, only the hour piece FIG. 1, or only the half-hour pieces, or only one half-hour piece and two quarter-hour pieces (i.e. hold one layer of pieces). Each piece at its vertex may be modified to fit around the form of the peg or similar structure so as to allow a set or sets of length-of-time puzzle pieces to fit into the puzzle base's recess simultaneous with the attachment of the hour and minute hands to the puzzle base.

Since the Time Machine is capable of other embodiments and of being practiced or carried out in various ways, without departing from the spirit and scope of the invention and without sacrificing any of its advantages, it is not limited in its application to the details of construction and arrangement of parts illustrated in the accompanying drawings. The terminology employed herein is for the purpose of description and not of limitation.

I claim as my invention:

1. An educational device to facilitate teaching and learning how to tell time comprising:
   a puzzle including a base and puzzle pieces which fit onto said base,
   said base having a representation of a clock face thereon, including the numbers from 1 to 12 signifying the hours,
   a recessed circular area on the inside of the numbers on the clock representation,
   a plurality of sets of puzzle pieces signifying different lengths of time, a first set comprising a circular piece representing one hour, a second set comprising two semi-circular pieces each representing half an hour, a third set comprising four one-quarter circle pieces each representing a fourth of an hour, a fourth set comprising six one-sixth circle pieces each representing ten minutes, a fifth set comprising twelve one-twelfth circle pieces each representing five minutes and a sixth set comprising a plurality of one-sixtieth segment pieces each representing one minute, at least one piece of each set bearing indicia indicative of the time that it represents,
   each set closely conforming to the circular outline of the recessed area of the base when fitted thereinto,
   said sets, when laid on top of each other, being identical in circular form,
   two pieces shaped to represent the hour and minute hands, respectively, of a real clock, and
   a peg adapted to secure the hour and minute hands to the base.

* * * * *